United States Patent
Fine et al.

(10) Patent No.: US 11,162,475 B1
(45) Date of Patent: Nov. 2, 2021

(54) SURFACE COATING FOR ENHANCED LIGHTNING PROTECTION OF WIND TURBINE BLADES AND OTHER COMPOSITE STRUCTURES

(71) Applicant: Arctura, Inc., South Kingstown, RI (US)

(72) Inventors: Neal E. Fine, North Kingstown, RI (US); John A. Cooney, Jr., Warwick, RI (US); Christopher S. Szlatenyi, Wakefield, RI (US); Adam H. Janik, Hampton Falls, NH (US); Pascal Mickelson, Morgantown, WV (US)

(73) Assignee: Ardura, Inc., South Kingstown, RI (US)

( * ) Notice: Subject to any disclaimer, the term of this patent is extended or adjusted under 35 U.S.C. 154(b) by 0 days.

(21) Appl. No.: 17/221,396

(22) Filed: Apr. 2, 2021

Related U.S. Application Data (60) Provisional application No. 63/089,434, filed on Oct. 8, 2020.

(51) Int. Cl.
*F03D 80/30* (2016.01)

(52) U.S. Cl.
CPC .......... *F03D 80/30* (2016.05); *F05B 2230/90* (2013.01); *F05B 2240/30* (2013.01); *F05B 2280/6011* (2013.01)

(58) Field of Classification Search
CPC .. F03D 80/30; F05B 2230/90; F05B 2240/30; F05B 2280/6011; B64D 45/02
See application file for complete search history.

(56) References Cited

U.S. PATENT DOCUMENTS

| | | | | |
|---|---|---|---|---|
| 4,186,237 A | * | 1/1980 | Propp | B64D 45/02 174/2 |
| 4,727,451 A | * | 2/1988 | Covey | B64D 45/02 174/2 |
| 4,796,153 A | * | 1/1989 | Amason | B64D 45/02 244/1 A |
| 6,320,118 B1 | * | 11/2001 | Pridham | B29C 65/4855 174/2 |
| 7,835,130 B2 | * | 11/2010 | Ware | B64D 37/32 361/218 |
| 2011/0135491 A1 | * | 6/2011 | Shah | B64G 1/546 416/241 R |
| 2011/0293437 A1 | * | 12/2011 | Krug | F03D 1/0675 416/241 A |

\* cited by examiner

*Primary Examiner* — Igor Kershteyn
*Assistant Examiner* — Joshua R Beebe
(74) *Attorney, Agent, or Firm* — Sunstein LLP (57) ABSTRACT

A method of protecting a wind turbine having a set of blades, each blade having a set of loci suitable for placement of a corresponding set of lightning receptors, against lightning strikes, includes applying to each blade a coating that surrounds at least one lightning receptor locus of the set, wherein the coating comprises paint in which has been mixed a conductive powder having a concentration by weight in the coating sufficiently low as to prevent formation of a conductive path through the coating but sufficiently high as to foster ionization of air along the coated exposed surface.

11 Claims, 5 Drawing Sheets

SURFACE COATING FOR ENHANCED LIGHTNING PROTECTION OF WIND TURBINE BLADES AND OTHER COMPOSITE STRUCTURES

RELATED APPLICATIONS

The present application claims the benefit of provisional application Ser. No. 63/089,434, filed Oct. 8, 2020, which is hereby incorporated herein by reference in its entirety.

TECHNICAL FIELD

The present invention relates to the diversion of electrical current through airborne ionization paths over wind turbine blades.

BACKGROUND ART

Every year, the global wind energy industry loses hundreds of millions of dollars to damage caused by lightning. These losses are expected to climb in the future, as the number of wind farms grows, the average turbine height increases, and global warming intensifies and increases lightning activity. Already susceptible to lightning because of their height, wind turbines have an even higher probability of being struck by lightning than a stationary metal tower of comparable size due to the rotation of the blades and the materials used in their construction. The lightning protection system (LPS) is therefore a critical element of wind turbine designs.

A typical turbine LPS includes one or more lightning terminals ("receptors") installed in the blade shell and connected to the hub, nacelle, tower, and foundation via a down conductor inside the blade. A typical lightning strike begins when the strong electric field induced by a charged storm cloud causes an upward streamer to emanate from the receptors on the surface of the blade. The direct strike results when one of the streamers connects with a downward leader from the cloud, passing a large amount of electrical charge in a short time through the turbine. When the lightning leader attaches to the receptors, the electrical energy passes through the down conductor to ground. However, the streamers on the blade frequently originate from the down conductor (or other metallic components) inside the blade, instead of the receptor, leading at best to punctures in the skins and at worst to devastating damage. Blade punctures that go untreated allow moisture to get into the skins of the blades, leading to additional structural deterioration.

There are two popular remedies available to improve the performance of the LPS and to reduce the likelihood that blade punctures will occur. The first is called a segmented diverter strip, which consists of a strip of conductive elements (e.g., copper or silver "dots") arrayed on an adhesive substrate. The elements are separated by air gaps of less than 1.0 mm. During the pre-strike period when streamers form, the air between the conductive elements ionizes. This results in the formation of an ionization channel above the diverter strip, which then provides a safe channel in the air through which the lightning energy conducts safely to ground.

The second remedy is to integrate a copper or aluminum foil (called an "expanded metal foil") or mesh with the top adhesive layer of the composite. Unlike the segmented diverter, which encourages the formation of ionization channels through the air, expanded metal foil products are designed to conduct the lightning charge to the down conductor. By spreading the charge over a large area, the foil is expected to safely discharge the strike without damaging the blade. The conductive layer also acts to electrically shield the down conductor and other internal elements, preventing the formation of streamers and arcs inside the blade.

In practice, these remedies are not robust. The segmented diverters erode quickly due to exposure to sun, rain, dirt, insects, and other environmental effects. As a result, they lose effectiveness over time and add aerodynamic drag, decreasing power generation. Expanded metal foil products are expensive and are often damaged by lightning strikes, leading to costly down time and repairs. What is needed in the art is a robust and inexpensive method of increasing the probability that lightning strikes on wind turbine blades will safely attach to the lightning receptors and conduct to ground without puncturing the blade.

BRIEF DESCRIPTION OF THE DRAWINGS

The foregoing features of embodiments will be more readily understood by reference to the following detailed description, taken with reference to the accompanying drawings, in which.

SUMMARY OF EMBODIMENTS

In one embodiment, the invention provides a method of protecting a wind turbine having a set of blades, each blade having a set of loci suitable for placement of a corresponding set of lightning receptors, against lightning strikes. In this embodiment, the method includes applying to an exposed surface of each blade of the set of blades a coating that surrounds at least one lightning receptor locus of the set, wherein the coating comprises paint in which has been mixed a conductive powder having a concentration by weight in the coating sufficiently low as to prevent formation of a conductive path through the coating but sufficiently high as to foster ionization of air along the coated exposed surface.

In one related embodiment, applying the coating includes applying it so as to surround each locus of the set. In another related embodiment, applying the coating includes applying it so that it coats both a pressure surface and a suction surface of each blade. In another related embodiment, applying the coating includes applying it so that it extends from a leading edge of each blade to a trailing edge of each blade. In another related embodiment, applying the coating includes applying it so that it extends to a tip of each blade. In another related embodiment, applying the coating includes applying the coating over an entire surface of each blade. In another related embodiment, the conductive powder is of a material selected from the group consisting of copper, graphite, nickel, silver, and combinations thereof.

In a further related embodiment, the conductive powder is copper and the concentration by weight is between 10 and 33 weight percent. In another further related embodiment, the conductive powder is graphite and the concentration by weight is between 5 and 10 weight percent.

In another embodiment, there is provided a wind turbine having blades that have been coated using any of the above methods. In yet another embodiment, there is provided the coating itself on a wind turbine blade that has been coated using any of the above methods.

In another embodiment, there is provided a method of protecting a composite structure against lightning strikes. In this embodiment, the method includes applying to an exposed surface of the composite structure a coating comprising paint in which has been mixed a conductive powder having a concentration by weight in the coating sufficiently low as to prevent formation of a conductive path through the coating but sufficiently high as to foster ionization of air along the coated exposed surface.

In a related embodiment, the conductive powder is copper and the concentration by weight is between 10 and 33 weight percent. In another related embodiment, the conductive powder is graphite and the concentration by weight is between 5 and 10 weight percent.

In another embodiment, there is provided a composite structure that has been coated using any of the previously recited methods applicable to a composite structure.

In another embodiment, there is provided the coating itself on a composite structure that has been coated using any of the previously recited methods applicable to a composite structure.

DETAILED DESCRIPTION OF SPECIFIC EMBODIMENTS

Definitions. As used in this description and the accompanying claims, the following terms shall have the meanings indicated, unless the context otherwise requires:

The "pressure surface" of a wind turbine blade is the side of the blade oriented to face the incoming wind.

The "suction surface" of a wind turbine blade is the side of the blade opposite the pressure surface, facing away from the wind.

The "leading edge" of a wind turbine blade is the foremost edge of the blade and the first part of the blade to meet the oncoming air as the turbine spins on its axis.

The "trailing edge" of a wind turbine blade is the rearmost edge of the blade downstream of the leading edge.

The "skin" of a wind turbine blade is the outer surface of the blade, typically comprised of fiberglass, resin, and finished with a coating or coatings of paint.

A "leader" is a typically downwardly propagating electrically conductive channel of ionized air associated with lightning. A leader is commonly (but not always) negatively charged and, as it nears its downward destination, an upward, connecting discharge of opposite polarity rises to meet it.

An "upward streamer" is an ionized region that initiates from a set of grounded portions of the blade in the presence of a storm cloud. A lightning strike occurs when the upward streamer connects with a downward leader from the storm cloud.

A "surface flashover" is an electrical discharge occurring in the air adjacent to the surface of the wind turbine blade.

A "conductive powder" is a collection of particles, however shaped, of a set of materials selected from the group consisting of metal, graphite, and combinations thereof. A conductive powder may therefore include particles of a plurality of metals. A conductive powder may alternatively or in addition include particles of a metal mixed with particles of graphite.

A "set" has at least one member.

Figure 1A:
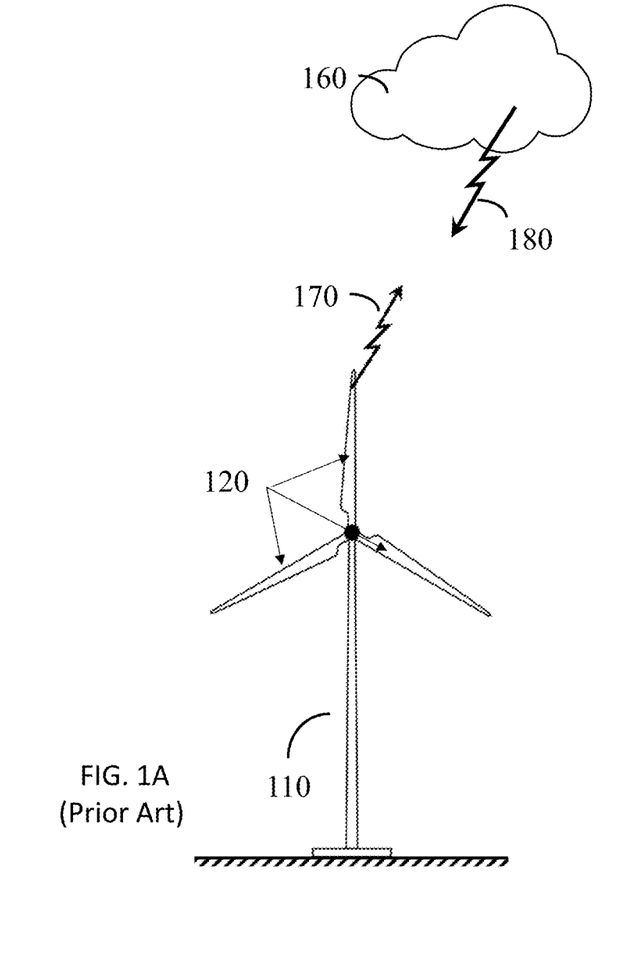
FIG. 1A shows a schematic drawing of a prior art utility-scale horizontal axis wind turbine in the presence of a charged storm cloud.
Figure 1B:
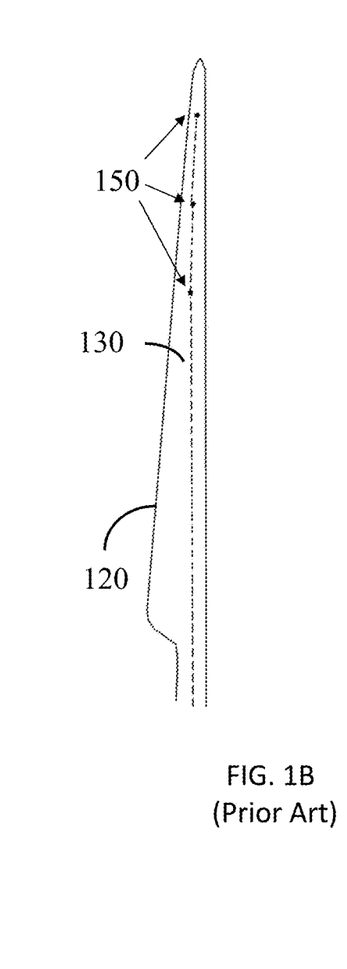
FIG. 1B shows an individual wind turbine blade, with a prior art lightning protection system including a set of lightning receptors and a down conductor.

FIG. 1A shows a modern prior art horizontal axis wind turbine 110 with three blades 120, in the configuration used by most utility-scale wind turbines. FIG. 1B shows a blade 120 of the wind turbine 110 of FIG. 1A outfitted with a prior art lightning protection system (LPS) that is designed to meet IEC Standard 61400-24. The LPS typically consists of down conductor 130 mounted inside the blade, connecting a set of lightning receptors 150 at loci on the blade's pressure and suction surfaces to the nacelle, tower, foundation, and ground. The down conductor is a large-gauge metal cable or braid that provides a path for the electrical charge generated by the lightning strike to be transferred safely to ground. Lightning receptors 150 are metal disks (also called "pucks") that are attached to the inside of the blade, connected electrically to the down conductor, and mounted flush with the outer skin of the blade. Receptors are generally circular disks with a radius of one to two inches, and are typically mounted near the mid-chord (half-way between the leading and trailing edges of the blade) on both the suction and pressure sides of the blade. The receptors may be distributed at a set of loci arranged spanwise between the root of the blade and the tip. Some wind turbines have metal receptors at the blade tips, also connected electrically to the down conductor, which work either in conjunction with or as a replacement for the disk receptors.

Referring again to FIG. 1A, a typical lightning strike begins when the strong electric field induced by charged storm cloud 160 causes upward streamer 170 to emanate from a point on or inside the blade. The direct strike results when streamer 170 connects with downward leader 180 from the cloud, passing a large amount of electrical power in a short time through the turbine.

Figure 2A:
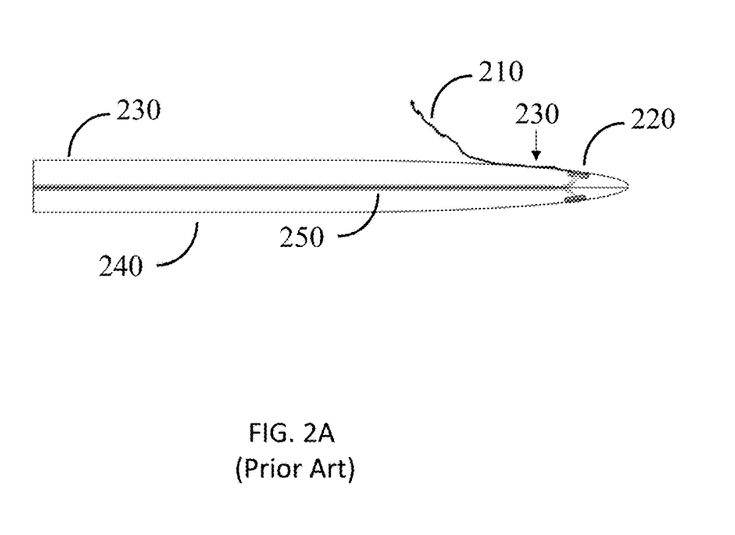
FIG. 2A and FIG. 2B show edge-on views of a prior art wind turbine blade with a depiction of desirable and undesirable upward streamers, respectively.

Referring again to FIG. 1B, when the LPS works well, the upward streamers emanate from one or more of the receptors 150 and the direct strike results in safe conduction of the lightning charge through the down conductor to ground. This situation is illustrated in FIG. 2A, where upward streamer 210 is shown originating at receptor 220. This figure depicts the blade from a viewpoint downstream of the trailing edge, with pressure side 230 on the "top" of the figure and suction side 240 on the "bottom." When lightning leader 180 (shown in FIG. 1A) connects with streamer 210, the charge is conducted safely to ground via down conductor 250. As depicted in FIG. 2A, portion 230 of streamer path 210 (the path that the lightning takes in reaching the receptor) is over the surface of the blade. This is an important and frequently occurring phenomenon called a "surface flashover."

Figure 2B:
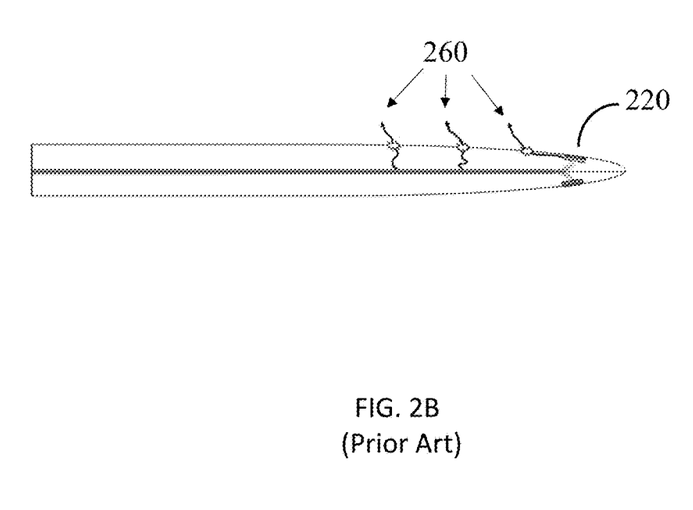

However, the upward streamers may instead originate from a point inside the blade, where the electric field strength can often be concentrated near the down conductor. This situation is illustrated in FIG. 2B, which shows undesirable streamers 260 emanating from down conductor 250 inside blade 120. When these undesirable streamers connect with a downward leader, the lightning strike can penetrate the skin of the blade, leading to punctures. In some circumstances, lightning strikes can lead to complete destruction of the blade.

Figure 3A:
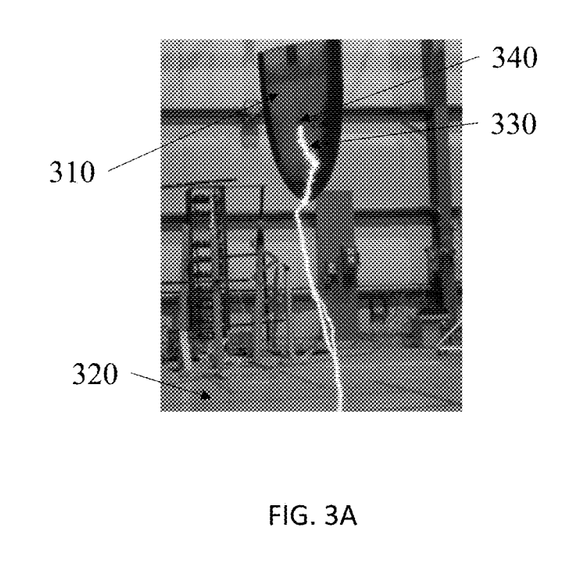
FIG. 3A and FIG. 3B are high-speed photographs of a laboratory simulated lightning event in a certified high-voltage laboratory, showing examples in which desirable and undesirable streamers, respectively, have formed on and in the tip of a wind turbine blade.
Figure 3B:
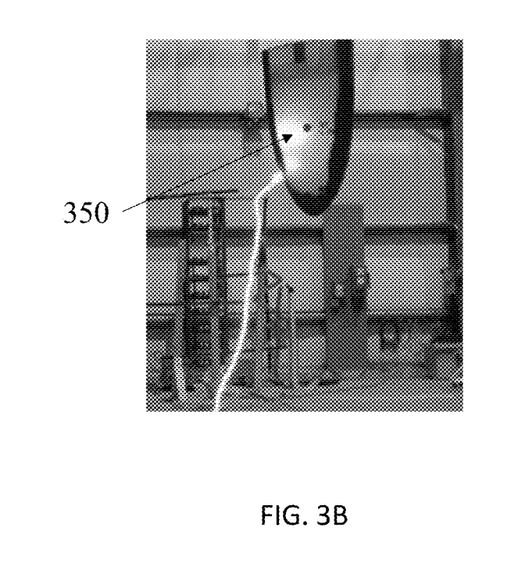

The two scenarios depicted in FIG. 2A and in FIG. 2B are further demonstrated in laboratory experiments, shown in FIG. 3A and in FIG. 3B, that we developed. Both figures are high-resolution photographs of wind turbine blade tip 310 undergoing lightning testing in a certified lightning simulation laboratory. In this high-voltage laboratory, floor 320 represents the cloud. Although this laboratory simulated lightning is inverted with respect to a natural lightning strike, in which the cloud is the high voltage side and the ground is low voltage, it is understood that it is the electric field strength that drives the lightning phenomenon, and not the value of the electrical potential on any particular surface. The certified lightning lab in which the experiments of FIG. 3 were performed produces the required electric field strength to initiate the laboratory simulated lightning.

An array of high voltage transformers (not shown) provides a high voltage potential (of either positive or negative polarity) between the down conductor (not shown) inside blade tip 310 and floor 320. In FIG. 3A, the laboratory simulated lightning strike emanates from floor 320 and connects to streamer 330 that forms at lightning receptor 340 and extends over the surface of the blade tip. Streamer 330 is an example of a surface flashover.

FIG. 3B shows an example in which the streamer forms inside the blade, which can be seen as a flash of light 350 projecting through the translucent fiberglass skin of blade tip 310. This laboratory simulated strike punctured through the blade skin near the trailing edge, leaving a hole that had to be patched prior to additional testing.

It is clear that the scenario depicted in FIG. 2A and demonstrated in FIG. 3A is preferable to the scenario depicted in FIG. 2B and demonstrated in FIG. 3B, because the latter leads to blade damage when the streamers puncture through the blade skin while the former results in safe passage of the lightning charge via a surface flashover to a lightning receptor and finally to ground.

Embodiments of the present invention increase the likelihood that a surface flashover will occur during a lightning event, leading to a higher probability that a lightning strike will connect with a lighting receptor and a lower probability that it will puncture the skin.

An embodiment of the present invention utilizes a coating applied to the surface of the blade either during blade construction or as a retrofit on an existing turbine. The coating includes discrete conductive elements mixed with a topcoat or paint, which is applied to the blade surface near the lightning receptors. The mixture, when applied to the surface of the blade, promotes the formation of a surface flashover whenever strike-preceding streamers are formed. When the streamer connects with an approaching lightning leader, the lightning currents are conducted to the lightning receptor via the streamer and the surface flashover, and then through the down conductor, and on to ground.

Figure 4:
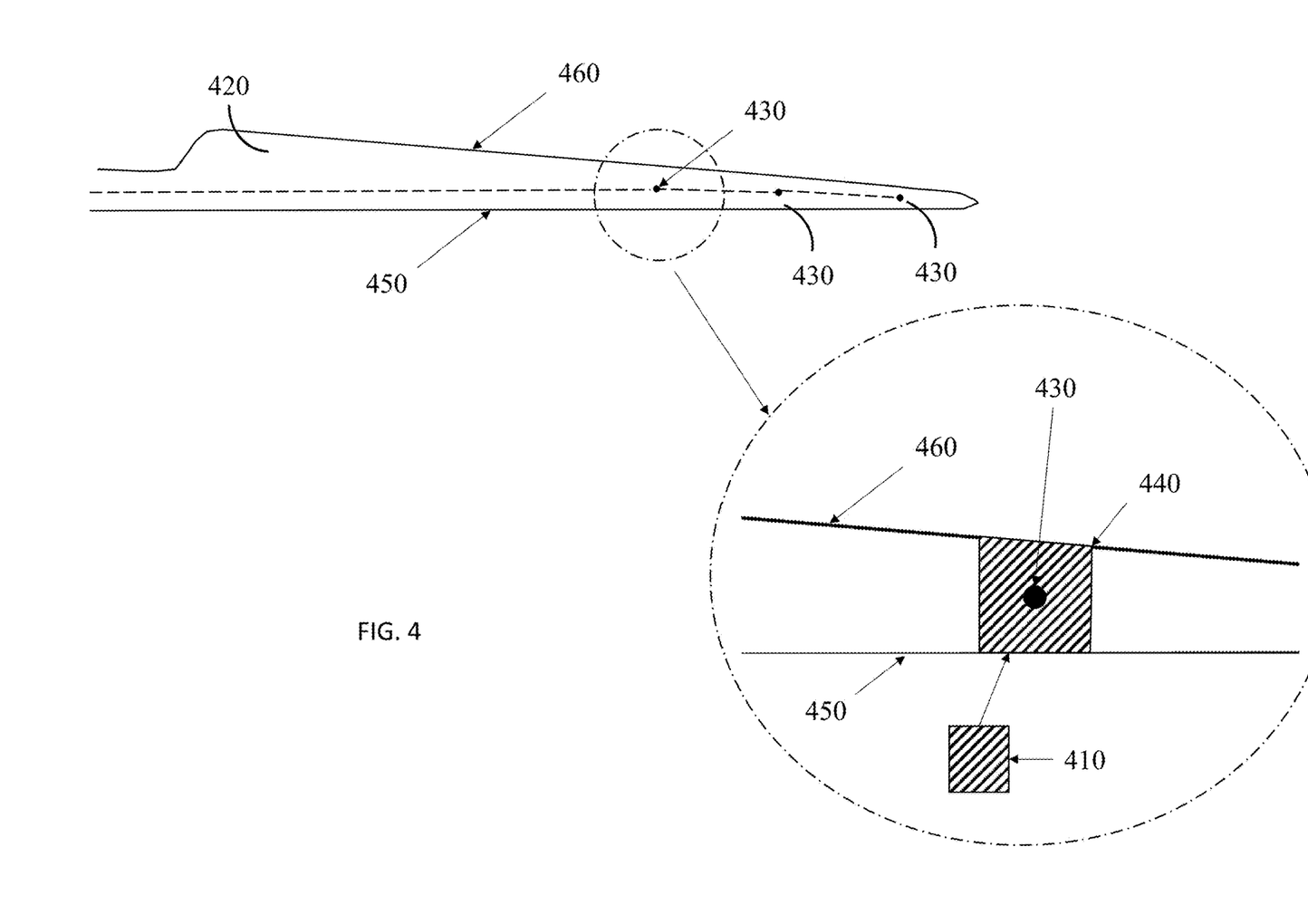
FIG. 4 shows a schematic planform view of a wind turbine blade and a blow-up of the area surrounding a lightning receptor, to which is applied a coating in accordance with an embodiment of the present invention.

In one embodiment of the present invention, as depicted in FIG. 4, coating 410 is applied to an exposed surface of blade 420 in the vicinity of lightning receptor 430. As discussed in connection with FIGS. 1A and 1B, the blade has a set of loci that provide conductive paths to ground. In accordance with embodiments of the present invention, coating 410 is particularly useful when applied to provide a path through an ionization channel over the exterior of the blade to the lightning receptor 430. The coating is applied in an approximately square or trapezoidal area 440 having a chordwise dimension that starts at or near leading edge 450 and extends to a location at or near trailing edge 460. The spanwise dimension of area 440 is approximately equal to the chordwise dimension and arranged such that lightning receptor 430 is approximately at the midpoint between inner edge 470 and outer edge 480 of area 440. The coating is applied in this way on both the suction and pressure sides of the blade. In this embodiment, the coating is applied in the vicinity of each lightning receptor mounted in each blade.

In another embodiment, the coating is applied to an entire section of blade from an inner radius of roughly 30-60% of the blade length to the tip, on both the pressure side and the suction side of the blade.

In another embodiment, the coating is applied to the entire blade.

In yet another embodiment, the coating is applied to sections of the blade forming circular or near-circular areas, each area surrounding a lightning receptor.

The coating in various embodiments of the present invention is a mixture of an off-the-shelf paint (also known as a "topcoat"), such as ALEXIT® BladeRep® Topcoat 12, and a conductive powder. It is an objective of the present invention that the coating has a sufficient concentration (as a percentage of total weight or total volume) of conductive elements to alter the electric field above the surface of the coating and inside the blade, but a concentration insufficient to enable conduction of electrical charge through the coating. We have found a narrow range of conductive element concentrations, particle sizes, and particle shapes that work to produce the desired surface flashover.

In one specific embodiment of the present invention, the topcoat is a two-part mixture of a base and a hardener, or a three-part mixture of a base, hardener, and thinner, purchased off-the-shelf and mixed according to the instructions of the manufacturer. Added to that mixture are copper particles smaller than 44 microns in diameter, in such an amount as to produce a mixture that is 10-33% by weight of the final product.

In another embodiment, the copper particles are dendritic flakes.

In another embodiment, the conductive powder is composed of graphite.

In another embodiment, the conductive powder is composed of nickel.

In another embodiment, the conductive powder is composed of silver.

An example of the preferred coating is prepared and applied as follows. The copper particles are prepared using a 325-mesh sieve to yield a volume of particles no larger than 44 microns in diameter. Topcoat ALEXIT® BladeRep® 12 is prepared by mixing the coating to manufacturer's specifications. A volume of copper particles is prepared such that the weight of the copper is equal to one third of the weight of the combined copper/topcoat mixture. The surface to be painted is cleaned and prepared according to the topcoat manufacturer's specifications. The topcoat/copper mixture is then applied to the surface using a standard paint roller with ⅜" nap (or other application method recommended by the manufacturer). The coating is then left to cure at room temperature without further treatment for the amount of time recommended by the topcoat manufacturer.

A second example uses Asbury Commons grade 3243 flake graphite without sieving, mixed with the ALEXIT® BladeRep® 12 topcoat such that the weight of the graphite is 10% of the weight of the graphite-topcoat mixture. The resulting mixture is applied to the prepared surface using a standard 3/16" nap roller.

We have found that mixing the conductive powder such as graphite or copper in greater concentrations leads to charge conduction through the cured topcoat and fails to produce the desired surface flashover. Thus, it is desirable for the conductive powders in the paint to have a concentration by weight so that the resultant coating has conductivity sufficiently low as to prevent formation of a conductive path through the coating but sufficiently high as to foster ionization of air along the exterior surface of the blade. We have found that the desired concentration range can readily be determined experimentally. For copper particles, concentrations between 10% and 33% by weight have been found to be effective in producing the desired surface flashover, while other concentrations outside this range do not produce the desired surface flashover. For graphite, concentrations between 5% and 10% by weight are effective in producing the desired surface flashover, while other concentrations outside this range do not produce the desired surface flashover.

In some circumstances, it may also be desirable to spray the coating on the blade surface using a commercially available paint spraying equipment.

We have found that a range of particle sizes yields the desired result. For copper, a volume of particles containing sizes particles smaller than or equal to 44 microns (corresponding to the 325-mesh sieve) are effective in producing the desired surface flashover, while larger particle sizes do not produce the desired surface flashover.

Figure 5A:
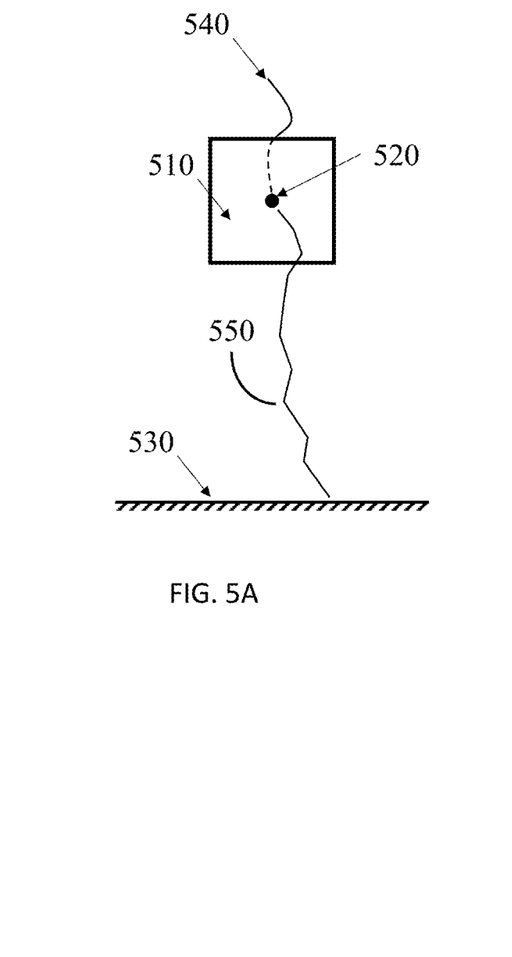
FIG. 5A is a diagram of a laboratory test set-up for evaluation of embodiments of the present invention.

In laboratory experiments, the efficacy of embodiments of this invention is evidenced by both observation and by quantitative measurement. Experiments were performed in a certified high-voltage laboratory. FIG. 5A is a diagram of a laboratory test set-up for evaluation of embodiments of the present invention. As shown in FIG. 5A, panel 510 is constructed of FR4 fiberglass composite laminate measuring 24 inches on a side and having a thickness of 0.0625 inches. Metal disk receptor 520, located in the center of panel 510, is 6.56 feet (2 meters) above metal floor 530, which acts as the ground plane. One end of wire 540 is attached to receptor 520 on the back side of panel 510 and the other end is attached to a high voltage (negative polarity) power supply. The voltage of the power supply is ramped up until electrical discharge arc 550 forms between ground plane 530 and receptor 520. The application of high voltage is repeated many times in order to build a database of voltage measurements (measured as a function of time between the power supply and wire 540) and high-resolution photographs for observation.

Figure 5B:
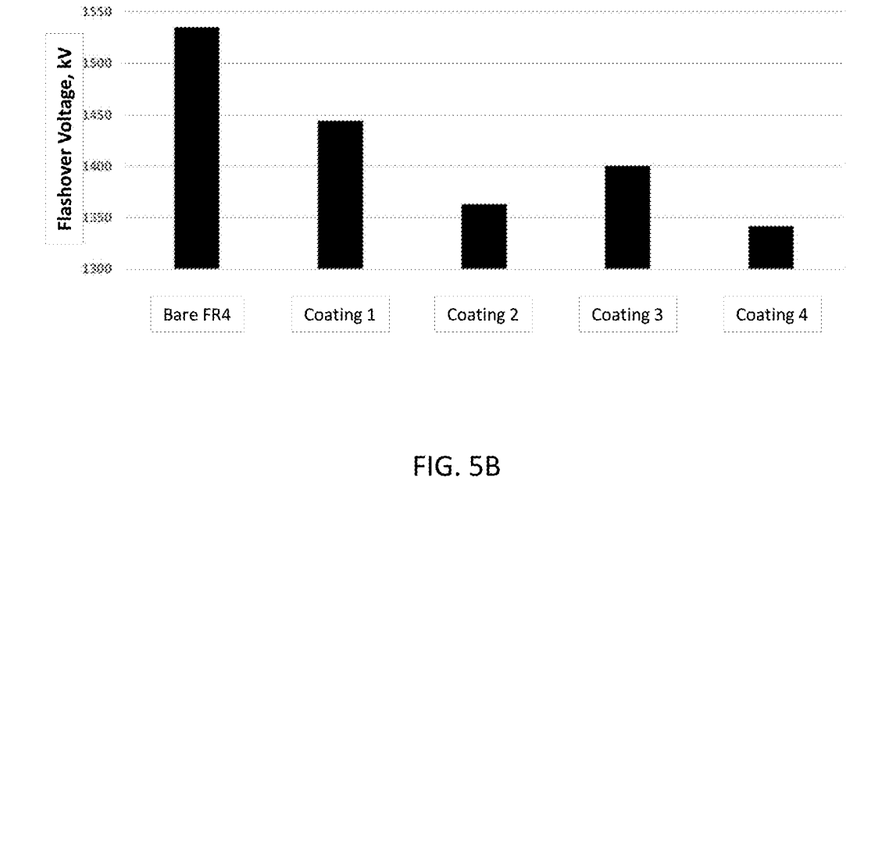
FIG. 5B is a set of bar graphs plotting mean flashover voltage, as determined using the test set-up of FIG. 5A, for an uncoated panel and for panels with four different coatings in accordance with embodiments of the present invention.

FIG. 5B is a set of bar graphs plotting mean flashover voltage, as determined using the test set-up of FIG. 5A, for an uncoated panel and for panels with four different coatings in accordance with embodiments of the present invention. The voltage at which the arc between floor 530 and receptor 510 occurs is known as the discharge voltage. The coating that is the subject of the present invention has the desired effect of reducing the discharge voltage when applied to the surface of panel 510. As shown in FIG. 5B, all four coating embodiments show a reduction in discharge voltage relative to the uncoated panel (shown as "Bare FR4" in the figure). The four embodiments use copper flakes in two sizes (large and small) and three concentrations (23%, 33%, and 43% by weight). Coating 1 uses large copper flakes, while Coatings 2, 3 and 4 use small copper flakes. Coating 1 and Coating 3 use 33% copper concentration, while Coating 2 uses 23% and Coating 4 uses 43%.

Analyzing the high-resolution photographs associated with this data shows that all events associated with the data shown in FIG. 5B resulted in surface flashovers. None of the events resulted in conduction through the surface coating. In contrast, when coatings with higher copper concentrations were used, the high-resolution photographs showed evidence of conduction through the surface coating.

The FR4 panels with the four coatings were also subjected to high current to determine if extreme currents generated by lightning strikes will damage the surface of the coating. In these tests, the panels were subjected to currents up to 200 kA and specific energies up to 6 MJ/Ohm. Only Coating 4 was damaged by the high current, leaving Coating 3 as the best choice of the set.

Although this application has primarily addressed the protection of wind turbines, in other embodiments the invention is applicable to composite components of aircraft (such as wings, fuselage, radomes, and appendages), other composite air vehicles, composite ships, composite buildings, and other composite structures that are susceptible to lightning strikes. In these embodiments, the invention includes applying to an exposed surface of the composite structure a coating comprising paint in which has been mixed a set of conductive powders having a concentration by weight in the coating sufficiently low as to prevent formation of a conductive path through the coating but sufficiently high as to foster ionization of air along the coated exposed surface. In many instances the composite components in question are part of a structure having a grounded conductor developed to handle lightning strikes. In these instances the coating can be placed on an exposed surface of the composite structure so as to provide a path through an ionization channel over the exterior of the structure to the grounded conductor so as to safely conduct the lightning charge to ground.

In other instances, such as on aircraft, in which the composite components are incapable of being electrically connected to ground, still a well-placed coating having the features described herein can be useful in directing the electrical energy from a lightning strike to discharge exit locations, where the energy can be safely discharged. In particular, the coating will be useful in protecting non-conducting components such as radomes, which cover radars and other sensitive electronics.

The embodiments of the invention described above are intended to be merely exemplary; numerous variations and modifications will be apparent to those skilled in the art. All such variations and modifications are intended to be within the scope of the present invention as defined in any appended claims.

We claim:

1. A method of protecting a wind turbine having a set of blades, each blade having a set of loci suitable for placement of a corresponding set of lightning receptors, against lightning strikes, the method comprising:
    applying to an exposed surface of each blade of the set of blades a coating that surrounds at least one lightning receptor locus of the set, wherein the coating comprises paint in which has been mixed a conductive powder having a concentration by weight in the coating sufficiently low as to prevent formation of a conductive path through the coating but sufficiently high as to foster ionization of air along the coated exposed surface;
    wherein the conductive powder is selected from the group consisting of (i) copper and the concentration by weight is between 10 and 33 weight percent and (ii) graphite and the concentration by weight is between 5 and 10 weight percent.

2. A method according to claim 1, wherein applying the coating includes applying it so as to surround each locus of the set.

3. A method according to claim 1, wherein applying the coating includes applying it so that it coats both a pressure surface and a suction surface of each blade.

4. A method according to claim 1, wherein applying the coating includes applying it so that it extends from a leading edge of each blade to a trailing edge of each blade.

5. A method according to claim 1, wherein applying the coating includes applying it so that it extends to a tip of each blade.

6. A method according to claim 1, wherein applying the coating includes applying the coating over an entire surface of each blade.

7. A wind turbine having blades that have been coated using the method according to claim 1.

8. A coating on a wind turbine blade that has been coated using the method according to claim 1.

9. A method of protecting a composite structure against lightning strikes, the method comprising:
   applying to an exposed surface of the composite structure a coating comprising paint in which has been mixed a conductive powder having a concentration by weight in the coating sufficiently low as to prevent formation of a conductive path through the coating but sufficiently high as to foster ionization of air along the coated exposed surface;
   wherein the conductive powder is selected from the group consisting of (i) copper and the concentration by weight is between 10 and 33 weight percent and (ii) graphite and the concentration by weight is between 5 and 10 weight percent.

10. A composite structure that has been coated using the method of claim 9.

11. A coating on a composite structure that has been coated using the method of claim 9.

* * * * *

UNITED STATES PATENT AND TRADEMARK OFFICE
CERTIFICATE OF CORRECTION

| | |
|---|---|
| PATENT NO. | : 11,162,475 B1 |
| APPLICATION NO. | : 17/221396 |
| DATED | : November 2, 2021 |
| INVENTOR(S) | : Neal E. Fine et al. |

It is certified that error appears in the above-identified patent and that said Letters Patent is hereby corrected as shown below:

On the Title Page

Item (73):
Replace "Ardura, Inc."
With "Arctura, Inc."

Signed and Sealed this
Seventeenth Day of May, 2022

Katherine Kelly Vidal
*Director of the United States Patent and Trademark Office*